US009583924B2

United States Patent
Thornton et al.

(10) Patent No.: US 9,583,924 B2
(45) Date of Patent: Feb. 28, 2017

(54) RESILIENT APERTURE COVER

(71) Applicant: Allied Moulded Products, Inc., Bryan, OH (US)

(72) Inventors: David L. Thornton, Bryan, OH (US); Thomas L. Elberson, Defiance, OH (US); Evan J. Geno, Malinta, OH (US)

(73) Assignee: ALLIED MOULDED PRODUCTS, INC., Bryan, OH (US)

( * ) Notice: Subject to any disclaimer, the term of this patent is extended or adjusted under 35 U.S.C. 154(b) by 13 days.

(21) Appl. No.: 14/663,935

(22) Filed: Mar. 20, 2015

(65) Prior Publication Data
US 2015/0270693 A1 Sep. 24, 2015

Related U.S. Application Data

(60) Provisional application No. 61/955,993, filed on Mar. 20, 2014.

(51) Int. Cl.
| H02G 3/18 | (2006.01) |
| H01R 13/52 | (2006.01) |
| H02G 3/08 | (2006.01) |
| H02G 3/14 | (2006.01) |

(52) U.S. Cl.
CPC ............. *H02G 3/088* (2013.01); *H01R 13/52* (2013.01); *H01R 13/5213* (2013.01); *H01R 13/5219* (2013.01); *H02G 3/081* (2013.01); *H02G 3/14* (2013.01)

(58) Field of Classification Search
CPC  H02G 3/14; H02G 3/18; H02G 3/081; H02G 3/088; H02G 3/083; H02G 3/085; H02G 15/013

USPC  174/50, 520, 549, 559, 59, 60, 64, 61, 650, 174/652, 659, 666; 277/602, 626
See application file for complete search history.

(56) References Cited

U.S. PATENT DOCUMENTS

| 4,408,695 | A | * | 10/1983 | Balkwill | H02G 3/088 174/57 |
| 4,626,617 | A | * | 12/1986 | Rye | H02G 3/126 174/53 |
| 4,794,207 | A | * | 12/1988 | Norberg | H02G 3/125 174/505 |
| 5,659,151 | A | * | 8/1997 | Dale | H02G 3/121 174/53 |
| 6,239,365 | B1 | * | 5/2001 | McEvers | H02G 3/088 174/50 |
| 6,969,277 | B2 | * | 11/2005 | Shackelford | H01R 4/70 439/521 |
| 8,124,872 | B2 | * | 2/2012 | Vigorito | B29C 45/14311 174/50 |

(Continued)

*Primary Examiner* — Dimary Lopez Cruz
(74) *Attorney, Agent, or Firm* — Fraser Clemens Martin & Miller LLC; James D. Miller

(57) ABSTRACT

An electrical box includes a housing having at least one aperture formed in an exterior surface thereof for providing access to a hollow interior of the electrical box. A cover formed from a resilient material is configured to extend over and conceal the at least one aperture. The cover includes one of an opening or a scored portion for creating an opening formed in an outer surface of the cover. The opening is configured to receive an electrical wire and portions of the cover forming the opening are configured to resiliently constrict about the electrical wire to prevent a flow of fluid through the opening and to secure a position of the electrical wire within the opening.

15 Claims, 3 Drawing Sheets

(56) References Cited

U.S. PATENT DOCUMENTS

| | | | | |
|---|---|---|---|---|
| 8,445,778 B2* | 5/2013 | Merritt | ................... | H02G 3/083 |
| | | | | 174/50 |
| 8,695,283 B2* | 4/2014 | Gagne | ...................... | H02G 3/20 |
| | | | | 52/3 |
| 2005/0227535 A1* | 10/2005 | Holman | ................. | H02G 3/088 |
| | | | | 439/587 |
| 2009/0188916 A1* | 7/2009 | Daviau | ................. | H02G 3/088 |
| | | | | 220/3.2 |
| 2015/0184777 A1* | 7/2015 | Ray | ...................... | G02B 6/4444 |
| | | | | 277/606 |

\* cited by examiner

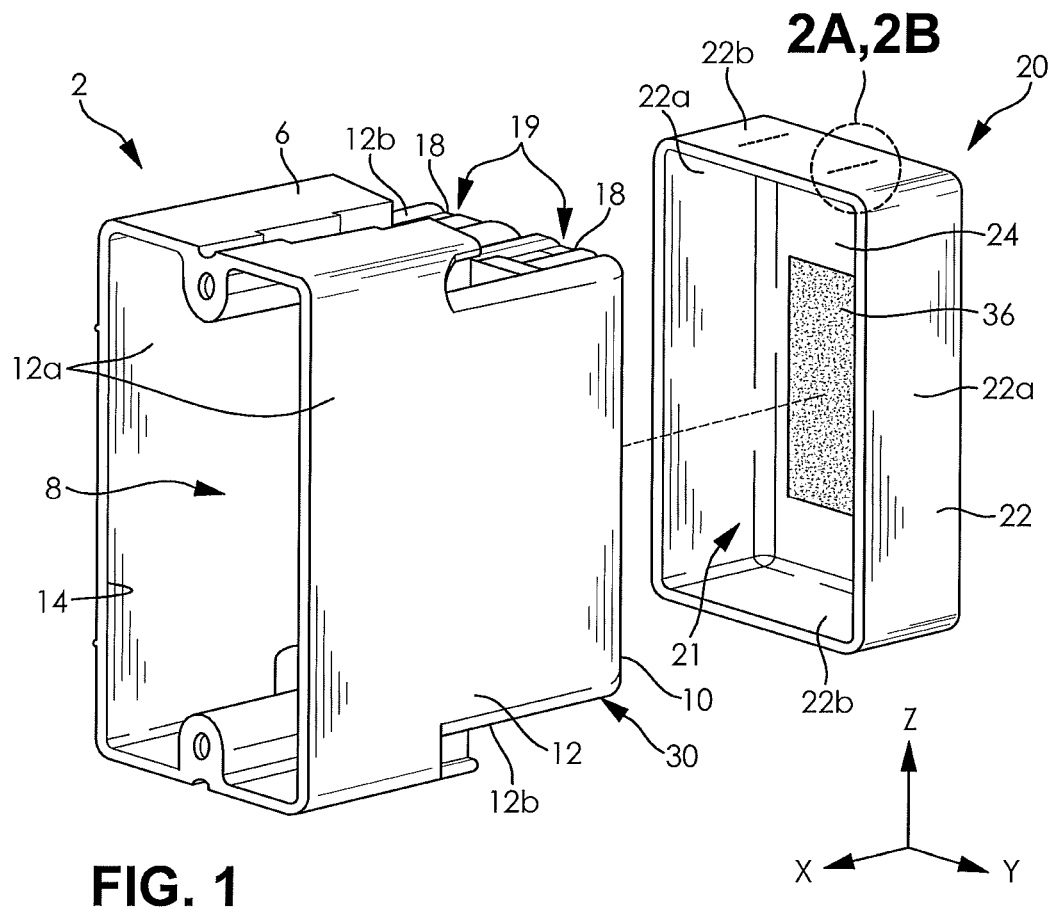
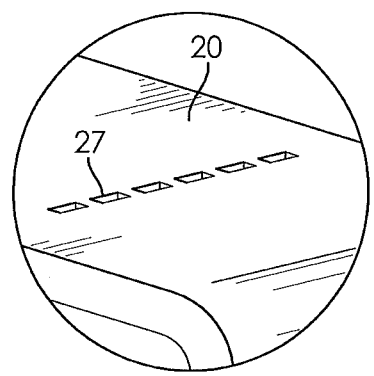 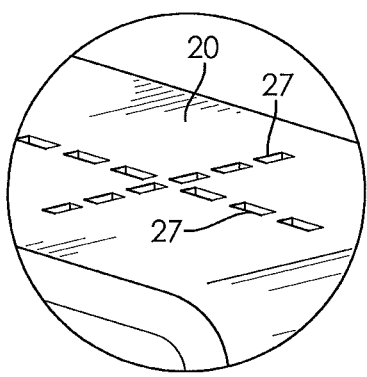
FIG. 1
FIG. 2A  FIG. 2B

RESILIENT APERTURE COVER

CROSS-REFERENCE TO RELATED APPLICATIONS

This application claims priority to U.S. Provisional Application Ser. No. 61/955,993, filed Mar. 20, 2014, the entire disclosure of which is hereby incorporated herein by reference.

FIELD OF THE INVENTION

The invention relates to an electrical box assembly, and more particularly to an insulating resilient cover configured to cover and conceal an aperture formed in an electrical box.

BACKGROUND

Electrical boxes are employed in a wide variety of applications as a means of providing a junction point for electrical wiring. Some common non-limiting applications of electrical boxes include switches, power receptacles, and fuse panels in building structures. Electrical boxes may also be used in a variety of other applications requiring junction points for electrical wiring such as automotive, aeronautical, and industrial applications, for example.

Generally, an electrical box is mounted in a desired location on a structure. Electrical wire is then routed throughout the structure to the electrical box. The electrical wire is typically passed through an aperture formed in an outer wall of the electrical box, where it is connected with an electrical device within the electrical box such as a switch, an outlet, or a fuse.

To facilitate the introduction of the electrical wire to the interior of the electrical box, the outer walls of electrical boxes typically contain at least one, and often several, of the apertures therein. These apertures vary in size and shape depending on the type of electrical box being used, but are typically larger in size than a cross-sectional area of the electrical wire being passed therethrough in order to allow easy insertion of the electrical wire. While oversized apertures are desirable as a means of maximizing installation efficiency, the oversized apertures also have the negative impact of leaving the interior of the electrical box exposed to the outside environment. This exposure allows air surrounding the electrical box to pass through the electrical box and enter into the building structure, thereby reducing thermal efficiency of the building structure. The oversized apertures also have the negative effect of permitting moisture and other contaminants to enter the electrical box, thereby accelerating the degradation of electrical connections within the electrical box or otherwise adversely affecting the electrical box.

Knockouts are one means of minimizing exposure of the interior of the electrical box to the outside environment. Knockouts are typically rigid obstructions within the aperture that can be removed or "knocked out" as needed to make additional apertures available for use. Knockouts are effective in preventing air, moisture, and contaminants from entering virgin apertures, but provide no protection once the knockout is removed and an electrical wire is inserted. Furthermore, the knockouts cannot be replaced if the electrical wire is removed from the electrical box at a later time because such knockouts are typically configured to be disposable as they do not include a means for being reinserted and secured within the apertures of the electrical box.

Another means of limiting exposure inside electrical boxes is to place a foam cover over the aperture. When an electrical wire is inserted into an aperture, an opening is formed in the foam cover similar in size to the cross section of the inserted electrical wire. The opening provides some protection from the outside environment so long as the electrical wire remains inserted in the electrical box, although due to the nature of the foam materials used, some leakage around the electrical wire does occur. However, upon removal of the electrical wire from the electrical box, the opening remains open, leaving the interior of the electrical box exposed to the exterior environment. Such foam covers also tend to rip easily, thereby creating additional pathways for air to enter the electrical box having the foam cover. Furthermore, due to the inelastic nature of foam, such foam covers tend to provide a loose fit that may also provide additional pathways between the electrical box and the foam cover for air to enter the electrical box.

In addition to undesired exposure to the environment, oversized apertures do not sufficiently secure inserted electrical wires within the box. Thus, once a wire is inserted through the oversized aperture, it must be held in place until being connected to the electrical device. This can be excessively cumbersome for a user as the user may have to secure a position of each of the electrical box, the wire, and electrical device relative to each other to more easily couple the wire to the electrical device.

One solution to this deficiency in the art has been the use of adjustable cable clamps installed in the oversized apertures. While effective, cable clamps can be cumbersome, requiring the clamp to be loosened and tightened whenever an electrical wire is inserted or removed. Cable clamps may also contribute to air entering the electrical box as such cable clamps often provide a rigid opening surrounding the wire that has a slightly larger cross-sectional area than the wire. Additionally, the cable clamp is an auxiliary apparatus that must be installed into each aperture as necessary.

Another solution to secure the electrical wire within the electrical box has been to include a clutching feature in the aperture. As the electrical wire is inserted through the aperture, the clutching feature opens inwardly, remaining in contact with the exterior of the electrical wire. When force is applied to remove the electrical wire from the electrical box, the clutching feature tightens against the electrical wire, preventing removal. While the clutching feature is effective in securing the electrical wire without auxiliary clamps, it prevents easy removal of the electrical wire when desired.

It is therefore desirable to produce a means for sealing peripheral apertures of an electrical box prior to and during insertion of an electrical wire, as well as after removal of the electrical wire, while removably securing the electrical wire within the aperture.

SUMMARY OF THE INVENTION

In concordance with the instant disclosure, a means for sealing peripheral apertures of an electrical box prior to and during insertion of an electrical wire, as well as after removal of the electrical wire, while removably securing the electrical wire within the aperture, is surprisingly discovered.

In one embodiment, a cover for an electrical box having at least one aperture formed in an exterior surface thereof for providing access to a hollow interior of the electrical box is disclosed. The cover comprises a main body formed from a resilient material. The main body is configured to extend over and conceal the at least one aperture formed in the electrical box.

In another embodiment, an electrical box assembly comprises an electrical box and a cover. The electrical box has at least one aperture formed in an exterior surface thereof for providing access to a hollow interior of the electrical box. The cover is configured to extend over and conceal the at least one aperture. The cover is formed from a resilient material configured to elastically extend over at least a portion of the exterior surface of the electrical box to secure the cover to the electrical box.

BRIEF DESCRIPTION OF THE DRAWINGS

FIG. 1 is a right side exploded perspective view of an electrical box and a cover according to an embodiment of the instant disclosure;

FIG. 2A is an enlarged fragmentary perspective view of a portion of the cover illustrated in FIG. 1;

FIG. 2B is an enlarged fragmentary perspective view of another embodiment of a portion of the cover illustrated in FIG. 1;

DETAILED DESCRIPTION OF THE INVENTION

Figure 3:
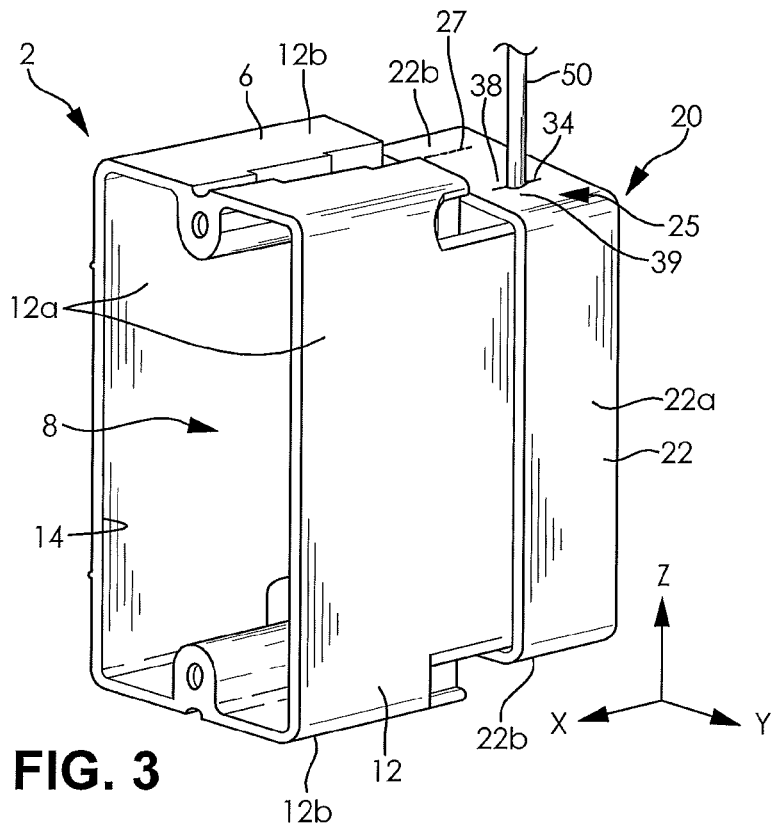
FIG. 3 is a right side perspective view of the electrical box illustrated in FIG. 1 shown assembled.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIG. 1 illustrates an electrical box 2 and a resilient aperture cover 20. The electrical box 2 may be any form of a structure used to house and enclose various electrical devices or components. As a non-limiting example, the electrical box 2 may be used to enclose electrical components found in a residential or commercial building structure. For example, the electrical box 2 may enclose an electrical outlet or a switch, as desired. The electrical box 2 may be secured in an outermost wall of such a building structure that is exposed to the ambient environment, causing the electrical box 2 to potentially serve as a flow path for air to flow between an interior of the building structure and an interior of the wall exposed to the ambient environment, thereby reducing a thermal efficiency of the building structure.

The electrical box 2 includes a housing 6 having a hollow interior 8 for enclosing an electrical device (not shown). The housing 6 is illustrated as substantially box shaped, including a closed rear wall 10, a plurality of sidewalls 12, and a front opening 14 formed opposite the rear wall 10. In place of the front opening 14, the electrical box 2 may include a closed front wall (not shown) or an access panel (not shown) depending on the application and configuration of the electrical box, as desired. The electrical box 2 may include a plurality of openings configured to receive fasteners therein or other known coupling features for securing the electrical box 2 to a building structure or for securing the electrical device within the electrical box 2, as desired. The openings may have any suitable shape, size, and placement configured to receive the fasteners without departing from the scope of the present invention.

The sidewalls 12 of the electrical box 2 may include a first pair of oppositely arranged and parallel sidewalls 12a in conjunction with a second pair of oppositely arranged and parallel sidewalls 12b. With reference to the X, Y, and Z axes illustrated in FIG. 1, the sidewalls 12a extend primarily in each of the X and Z directions while the sidewalls 12b extend primarily in each of the X and Y directions. The rear wall 10 and the front opening 14 accordingly have rectangular shapes corresponding to a profile of the periphery of the plurality of sidewalls 12a, 12b. Similarly, if another shape or configuration for the plurality of sidewalls 12 is selected based on the desired application for the electrical box 2, the rear wall 10 and the front opening 14 also have shapes corresponding to the profile of the periphery of the sidewalls 12. For example, if the electrical box 2 instead includes six of the sidewalls 12 arranged into a hexagonal shape, then the resulting rear wall 10 and front opening 14 would also have corresponding hexagonal shapes. As a further non-limiting example, the sidewalls 12 of the electrical box 2 may be formed into a substantially circular cylindrical shape or may include both planar and curved portions as the sidewalls 12 extend about a circumference of the electrical box 2. It should be understood that the electrical box 2 may have any suitable shape and configuration for enclosing the electrical devices enclosed therein. As will be described hereinafter, any configuration of the electrical box 2 may be used in conjunction with a corresponding resilient aperture cover 20 having the same configuration as the electrical box 2 while remaining within the scope of the present invention.

FIG. 1 illustrates a plurality of knockouts 19 formed in the housing 6 of the electrical box 2. Each of the knockouts 19 is a portion of the electrical box 2 that is removable, or capable of being "knocked out," in order to provide access to the hollow interior 8 of the electrical box 2, thereby creating at least one aperture 18 in the housing 6 upon removal of the knockout 19. As shown in FIG. 1, the knockouts 19 and corresponding apertures 18 may be formed in one of the sidewalls 12, but it should be understood that the knockouts 19 and apertures 18 may also be formed in the rear wall 10 of the electrical box 2, as desired. The aperture 18 remains open following removal of the knockout 19 because the knockout 19 is not configured to be re-secured within the aperture 18 following removal thereof. Accordingly, once one of the knockouts 19 has been removed from the housing 6 of the electrical box 2, the aperture 18 is permanent and will remain in place of the removed knockout 19. As such, it should be understood that any reference to one of the knockouts 19 hereinafter also indicates the inclusion of one of the apertures 18 having a corresponding shape, size, and orientation formed in the housing 6 at the location of the knockout 19.

The at least one aperture 18 formed in the electrical box 2 is configured to receive an electrical wire (illustrated in FIG. 3) for connection to the electrical device disposed within the hollow interior 8 of the electrical box 2. The at least one aperture 18 is illustrated in FIG. 1 as being formed in what is depicted as an uppermost one of the sidewalls 12b following removal of the corresponding knockout 19. However, it should be understood that the at least one aperture 18 may be formed in any of the sidewalls 12 of the electrical box 2 or may be formed in a rear wall 10 of the electrical box 2, as desired. Furthermore, it should be understood that the at least one aperture 18 may be pre-formed in any surface of the electrical box 2 during a manufacturing process thereof without a corresponding knockout 19, as desired.

The electrical box 2 includes an exterior surface 30 configured to receive the resilient aperture cover 20. The exterior surface 30 may include at least a portion of one or more of the sidewalls 12 and at least a portion of the rear wall 10, or any combination of portions of the sidewalls 12 and portions of the rear wall 10, as desired. As should be understood, the exterior surface 30 of the electrical box 2 may form a projecting portion of the electrical box 2 suitable for being surrounded or otherwise enclosed by a portion of the resilient aperture cover 20, as desired.

The resilient aperture cover 20 includes a main body formed by a material having a low gas and moisture permeability and a suitable elasticity and resiliency for being elastically received over the exterior surface 30 of the electrical box 2. The resilient aperture cover 20 may be formed from an elastomer, for example. One exemplary elastomer suitable for forming the resilient aperture cover 20 is butyl rubber. Butyl rubber may be desirable for forming the resilient aperture cover 20 as it also has a relatively high resistance to heat aging, weather, ozone, chemical attack, abrasion, and tearing. Butyl rubber also has relatively low levels of both thermal and electrical conductivity, allowing the butyl rubber to act as a suitable insulator in both respects. However, it should be understood that other elastic, resilient, and insulating materials may be used in place of the butyl rubber without departing from the scope of the present invention.

The resilient aperture cover 20 is illustrated in FIG. 1 with four sidewalls 22 extending transversely from a rear wall 24, causing the resilient aperture cover 20 to be generally tray-shaped. The sidewalls 22 are arranged in a rectangular shape substantially corresponding to a shape and configuration of the sidewalls 12 of the electrical box 2. The sidewalls 22 of the resilient aperture cover 20 may include a first pair of oppositely arranged and parallel sidewalls 22a in conjunction with a second pair of oppositely arranged and parallel sidewalls 22b formed into a rectangular shape. With reference to the X, Y, and Z axes illustrated in FIG. 1, the sidewalls 22a extend primarily in each of the X and Z directions while the sidewalls 22b extend primarily in each of the X and Y directions. The rear wall 24 of the resilient aperture cover 20 extends primarily in the Y and Z directions and has a rectangular shape corresponding to a shape of the rear wall 10 of the electrical box 2 and a periphery of the sidewalls 22. However, as explained hereinabove, it should be understood that the resilient aperture cover 20 may have other shapes and configurations depending on a shape and configuration of the housing 6 of the electrical box 2. For example, if the sidewalls 12 of the electrical box 2 are alternatively formed into a circular cylindrical shape or a hexagonal shape, the sidewalls 22 of the resilient aperture cover 20 may similarly be formed into a circular cylindrical shape or a hexagonal shape, respectively.

The resilient aperture cover 20 forms a boot configured to be disposed over the exterior surface 30 of the electrical box 2. Accordingly, the resilient aperture cover 20 may have an interior surface 21 having substantially the same shape and configuration as the exterior surface 30 of the electrical box 2 to allow the resilient aperture cover 20 to be received thereon. To provide for a secure fit between the exterior surface 30 of the electrical box 2 and the interior surface 21 of the resilient aperture cover 20, the resilient aperture cover 20 may be formed to have at least one dimension that is reduced relative to the exterior surface 30 of the electrical box 2. For example, a distance between the sidewalls 22a forming the interior surface 21 of the resilient aperture cover 20 may be reduced relative to a distance between the sidewalls 12a forming the exterior surface 30 of the electrical box 2. Similarly, a distance between the sidewalls 22b forming the interior surface 21 of the resilient aperture cover 20 may be reduced relative to a distance between the sidewalls 12b forming the exterior surface 30 of the electrical box 2. Alternatively, the interior surface 21 of the resilient aperture cover 20 may have substantially the same shape and configuration as the exterior surface 30 of the electrical box 2 while scaled down to be slightly smaller in each corresponding dimension. In all cases, the interior surface 21 of the resilient aperture cover 20 is configured to securely fit over the exterior surface 30 of the electrical box 2 due to the elasticity and resiliency of the material forming the resilient aperture cover 20.

At least a portion of the interior surface 21 of the resilient aperture cover 20 may include an adhesive 36 disposed thereon for affixing the resilient aperture cover 20 to the exterior surface 30 of the electrical box 2. The adhesive 36 may for example be disposed on portions of the sidewalls 22 or a portion of the rear wall 24, for example. FIG. 1 illustrates the adhesive 36 as being formed on a portion of the rear wall 24 of the resilient aperture cover 20. The adhesive 36 may, for example, include a removable covering (not shown) that is separated from the adhesive 36 when the resilient aperture cover 20 is first being installed over the exterior surface 30 of the electrical box 2. Inclusion of the adhesive 36 on the interior surface 21 of the resilient aperture cover 20 may allow for the interior surface 21 of the resilient aperture cover 20 to have substantially the same shape, size, and configuration as the exterior surface 30 of the electrical box 2 as the adhesive 36 secures a positioning of the resilient aperture cover 20 absent the resilient effect caused by the reduced dimension of the resilient aperture cover 20.

The resilient aperture cover 20 may include at least one opening 25 formed therein (illustrated in FIG. 3) corresponding to the at least one aperture 18 formed in the electrical box 2. The at least one opening 25 is accordingly positioned on the resilient aperture cover 20 to extend over and be aligned with the at least one aperture 18 when the resilient aperture cover 20 is fully received on the exterior surface 30 of the electrical box 2.

With reference to FIG. 2A, the resilient aperture cover 20 may include a scored or perforated portion 27 formed in an outer surface thereof. The scored portion 27 corresponds to a location of one of the openings 25 in lieu of the at least one opening 25 being pre-formed in the resilient aperture cover 20. The scored portion 27 is shown in FIG. 2A as being linear and suitable for forming an opening 25 resembling a linear slit 34, as best illustrated in FIG. 3. A first portion 38 of the resilient aperture cover 20 is formed to a first side of the slit 34 and a second portion 39 of the resilient aperture cover 20 is formed to a second side of the slit 34. Accordingly, the at least one opening 25 may be widened to accommodate the entry of an electrical wire by pulling the first portion 38 in a direction away from the second portion 39.

Accordingly, in similar fashion to the knockouts 19 of the electrical box 2, the resilient aperture cover 20 may allow a user to choose when to form one of the openings 25 by penetrating the resilient aperture cover 20 along the scored portion 27, as desired. The penetration of the scored portion 27 may be accomplished by pressing the electrical wire against the scored portion 27 or by using a suitable cutting tool, as desired. The user may therefore choose to only form one of the openings 25 in the resilient aperture cover 20 when the corresponding knockout 19 has been removed from the electrical box 2 to avoid the introduction of unnecessary air flow paths through the resilient aperture cover 20 when not in use.

With reference to FIG. 2B, in place of a single linear scored portion 27 forming a single linear slit 34, the resilient aperture cover 20 may instead include a pair of transversely extending scored portions 27 forming a cross-hair pattern. As such, it should be understood that a resulting opening 25 will similarly have a cross-hair pattern including four flapped portions of the resilient aperture cover 20 meeting at an intersection of the scored portions 27. Other shapes and configurations of scored portions 27 may be used to create a variety of openings 25 having desired shapes, sizes, and configurations. For example, a circular scored portion 27 may be used to form a substantially circular opening 25 adapted to closely fit a substantially cylindrical electrical wire disposed therein, as desired.

In use, the user may first remove one of the knockouts 19 formed in the electrical box 2 to form at least one of the apertures 18. Alternatively, the electrical box 2 may be provided with at least one aperture 18 pre-formed within the housing 6, as desired. Next, the user may penetrate the scored portion 27 formed in the resilient aperture cover 20 to form one of the openings 25. Alternatively, the resilient aperture cover 20 may be provided having one of the openings 25 pre-formed therein in place of the scored portion 27, as desired. The user then places the resilient aperture cover 20 over the exterior surface 30 of the electrical box 2 in a manner wherein the sidewalls 22 of the resilient aperture cover 20 extend over the sidewalls 12 of the electrical box 2 until the rear wall 24 of the resilient aperture cover 20 abuts the rear wall 10 of the electrical box 2. The resilient aperture cover 20 may be in need of stretching in at least one direction due to the reduced dimension of the interior surface 21 of the resilient aperture cover 20 in comparison to the corresponding dimension of the exterior surface 30 of the electrical box 2, as described hereinabove. Alternatively, the sidewalls 22 of the resilient aperture cover 20 may be configured to expand elastically outwardly as the sidewalls 22 come into contact with the sidewalls 12 forming the exterior surface 30 of the electrical box 2, thereby causing the sidewalls 22 of the resilient aperture cover 20 to resiliently attempt to retract to an original position to provide a secure fit of the resilient aperture cover 20 over the exterior surface 30 of the electrical box 2. In any circumstance, the at least one reduced dimension of the interior surface 21 of the resilient aperture cover 20 when compared to the corresponding dimension of the exterior surface 30 of the electrical box 2 hinders undesired relative movement between the portions 38, 39 forming the resilient aperture cover 20 and the electrical box 2.

Referring now to FIG. 3, once the resilient aperture cover 20 is placed over the exterior surface 30 of the electrical box 2, the at least one opening 25 is aligned with and overlays the at least one aperture 18 of the electrical box 2. The opening 25 is illustrated in FIG. 3 as the linear slit 34 extending adjacent the at least one aperture 18. An electrical wire 50 is then placed through the at least one opening 25 and extends into the hollow interior 8 of the electrical box 2. The resiliency of the resilient aperture cover 20 causes the at least one opening 25 to constrict and attempt to return to the original linear shape when the first portion 38 of the resilient aperture cover 20 is separated from the second portion 39 thereof to allow for entry of the wire 50. Accordingly, the first portion 38 and the second portion 39 of the resilient aperture cover 20 each constrict about the wire 50 in a manner wherein fluid flow passages formed about a periphery of the wire 50 are minimized due to a sealing engagement of the resilient aperture cover 20 to the wire 50, thereby allowing for the resilient aperture cover 20 to maximize a thermal efficiency of a building structure having the electrical box 2.

Additionally, the tendency of the portions 38, 39 forming the opening 25 to retract and constrict about the wire 50 advantageously allows for a position of the wire 50 relative to the aperture 18 to be restricted by the force of the retraction of the portions 38, 39 forming the opening 25 to allow a user to more easily manipulate the wire 50 within the hollow interior 8 of the electrical box 2. Accordingly, the resiliency of the material forming the resilient aperture cover 20 provides for a frictional engagement of the portions 38, 39 forming the opening 25 to the wire 50 to both prevent the flow or fluid into the hollow interior 8 of the electrical box 2 and to restrict an undesired movement of the wire 50 relative to the portions 38, 39 forming the opening 25.

Furthermore, the resilient aperture cover 20 offers the added benefit of forming another insulating layer between the ambient environment and the hollow interior 8 of the electrical box 2. Accordingly, in addition to hindering the flow of fluid through the at least one opening 25 and the at least one aperture 18, the resilient aperture cover 20 may also further hinder heat conduction directly through the rear wall 10 and the sidewalls 22 of the electrical box 2.

In some cases, the rear wall 24 of the resilient aperture cover 20 may include the adhesive 36 disposed thereon for securely affixing the resilient aperture cover 20 to the exterior surface 30 of the electrical box 2. If such an adhesive is not used, the resilient aperture cover 20 may be removed from the exterior surface 30 of the electrical box 2 by stretching the sidewalls 22 of the resilient aperture cover 20 away from the sidewalls 12 of the electrical box 2 before translating the resilient aperture cover 20 away from the electrical box 2.

Additionally, the portions 38, 39 forming the at least one opening 25 are configured to retract to the original form and configuration following removal of the wire 50, thereby causing the at least one opening 25 to return to a substantially closed position wherein each of the first portion 38 and the second portion 39 come into contact with each other to prevent a flow of fluid through the at least one opening 25. As should be understood, other configurations of the at least one opening 25 may also cause the portions 38, 39 forming the at least one opening 25 to resiliently constrict about the wire 50 or to resiliently constrict to a closed position. For example, the cross-hair pattern of the scored portions 27 illustrated in FIG. 2B will result in an opening 25 having four flapped portions that resiliently attempt to return to a position wherein the four flaps contact each other, thereby causing the portions 38, 39 forming the opening 25 to constrict about the electrical wire 50 or return to an original configuration of the opening 25.

Figure 4:
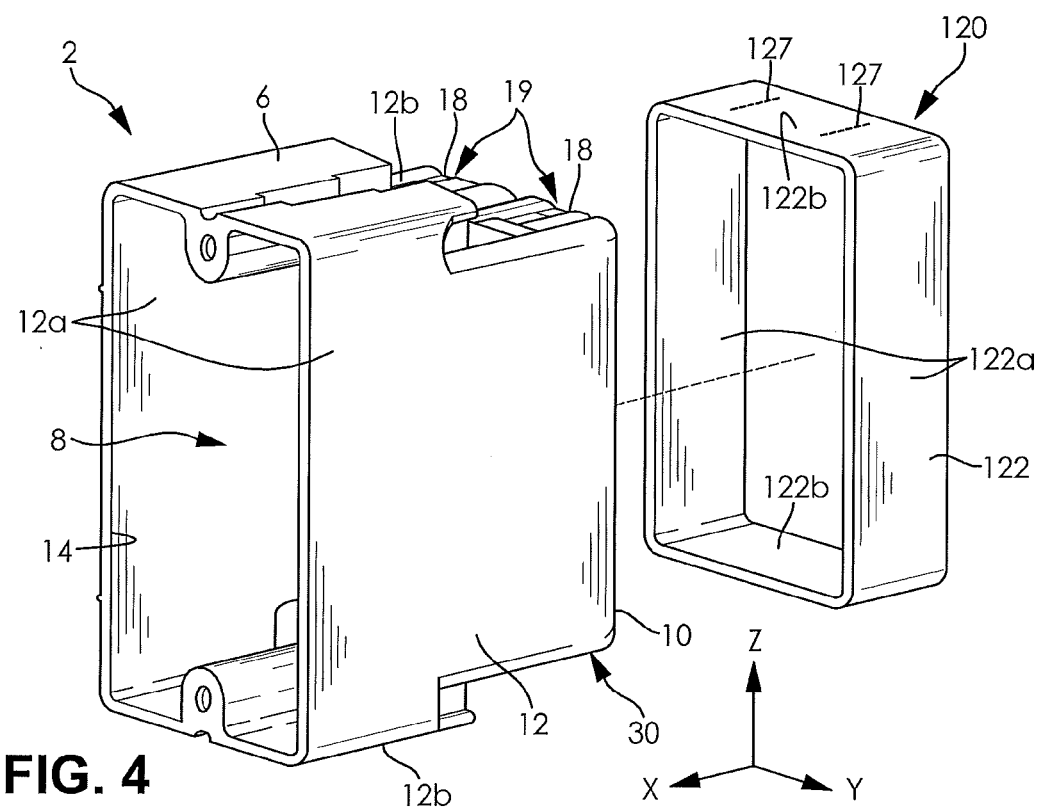
FIG. 4 is a right side exploded perspective view of an electrical box and a cover according to another embodiment of the instant disclosure.

FIG. 4 illustrates the electrical box 2 and a resilient aperture cover 120 according to another embodiment of the invention. The resilient aperture cover 120 is substantially similar to the resilient aperture cover 20 except for the removal of the rear wall 24 thereof. The resilient aperture cover 120 includes at least one scored portion 127 formed therein for creating at least one opening (not shown) having the same characteristics of the at least one opening 25 of the resilient aperture cover 20. Similarly, the at least one opening may also be formed by penetrating the pre-formed scored portion 127 disposed on a surface of the resilient aperture cover 120, as desired. Alternatively, it should be understood that the resilient aperture cover 120 may be manufactured to include a pre-formed one of the openings therein, as desired. The resilient aperture cover 120 is also preferably formed of a resilient, fluid impermeable material such as butyl rubber.

The resilient aperture cover 120 illustrated in FIG. 4 includes a plurality of sidewalls 122 formed into a sleeve configured to be received over the sidewalls 12 of the electrical box 2. The sidewalls 122 of the resilient aperture cover 120 may include a first pair of oppositely arranged parallel sidewalls 122a in conjunction with a second pair of oppositely arranged parallel sidewalls 122b. With reference to the X, Y, and Z axes illustrated in FIG. 4, the sidewalls 122a extend primarily in each of the X and Z directions while the sidewalls 122b extend primarily in each of the X and Y directions. In order to ensure a secure fit of the resilient aperture cover 120 over the exterior surface 30 of the electrical box 2, at least one dimension of the resilient aperture cover 120 may be reduced in comparison to a corresponding dimension of the exterior surface 30 of the electrical box 2. For example, a distance between the sidewalls 122a may be reduced in comparison to a distance between the sidewalls 12a of the electrical box 2 or a distance between the sidewalls 122b may be reduced in comparison to a distance between the sidewalls 12b of the electrical box 2. In either case, the resilient aperture cover 120 may be stretched elastically to be placed over the exterior surface 30 of the electrical box 2, allowing the resiliency of the resilient aperture cover 120 to secure a position of the resilient aperture cover 120 relative to the electrical box 2 when the resilient aperture cover 120 attempts to retract to its original non-stretched configuration.

The resilient aperture cover 120 has been described as having sidewalls 122 corresponding to the sidewalls 12 of the electrical box 2, but it should also be understood that the resilient aperture cover 120 may be adapted as a substantially cylindrical band that is configured to be stretched over various different shapes and configurations of electrical boxes 2. For example, such a band-like resilient aperture cover 120 may be adapted to be stretched and placed over a substantially cylindrical portion of the exterior surface 30 of the electrical box 2. So long as an outer circumference of the exterior surface 30 of the electrical box 2 adapted to receive the resilient aperture cover 120 is smaller than a circumference of the resilient aperture cover 120, the resilient aperture cover 120 is able to be resiliently retained at a specified position on the electrical box 2 after it has been stretched over the exterior surface 30 thereof.

Figure 5:
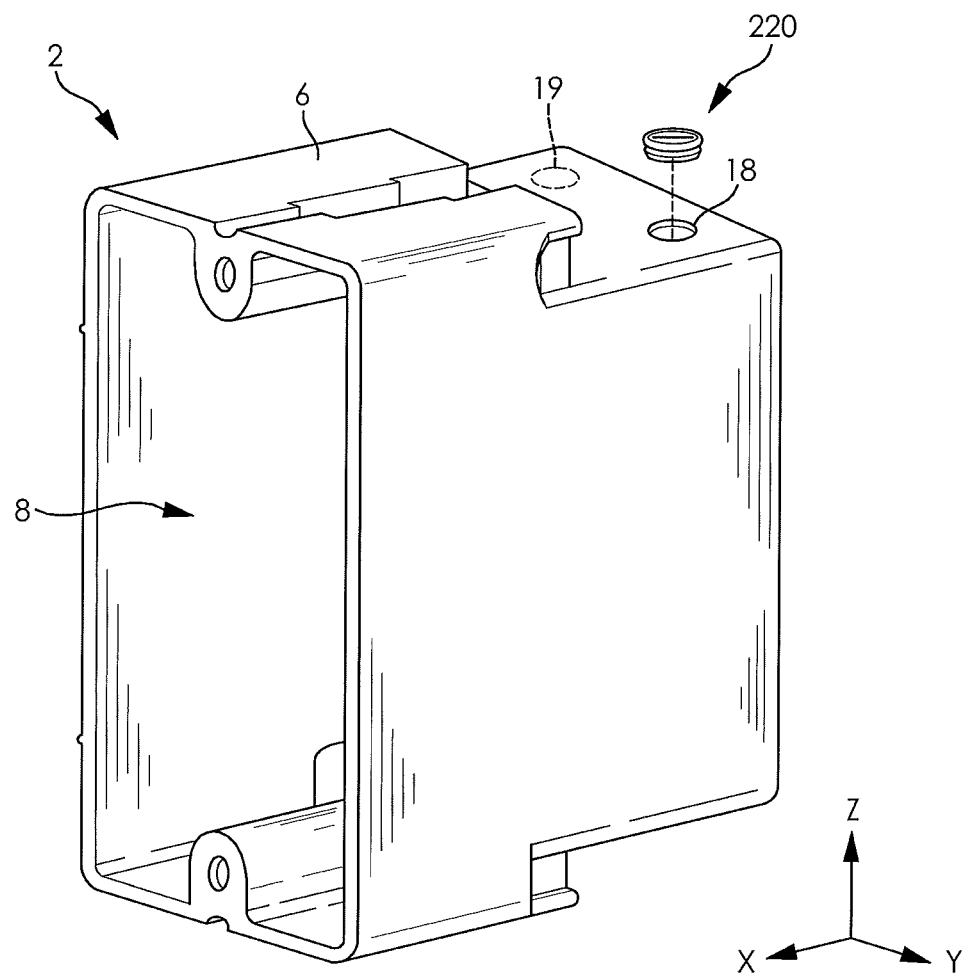
FIG. 5 is a right side exploded perspective view of an electrical box and a cover according to another embodiment of the instant disclosure.
Figure 6:
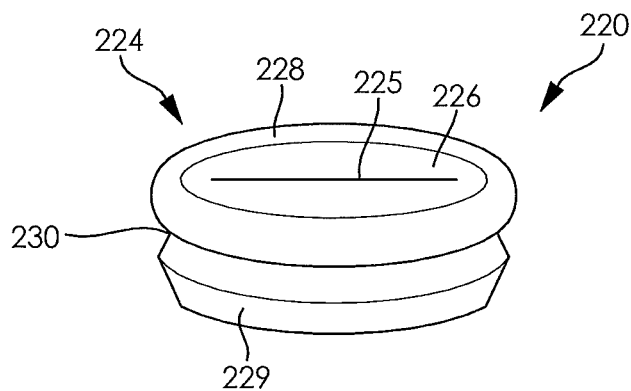
FIG. 6 is an enlarged perspective view of the cover illustrated in FIG. 5.

FIGS. 5 and 6 illustrate another embodiment of the present disclosure in which a resilient aperture cover 220 includes a grommet 224 that is shaped and dimensioned to be received within the at least one aperture 18 formed in the electrical box 2. The grommet 224 may accordingly be installed in one of the apertures 18 in the place of one of the knockouts 19 during manufacturing of the electrical box 2, or the grommet 224 may be fitted into the at least one aperture 18 of the electrical box 2 by the user after removal of the at least one knockout 19.

The grommet 224 as shown includes a membrane 226 and a rib 228 bounding a perimeter of the membrane 226. The membrane 226 is formed of a resilient material, such as butyl rubber, and includes an opening 225 formed therein having similar characteristics as each of the openings 25, 125 of the resilient aperture covers 20, 120. The opening 225 may also be formed by penetrating a preformed score line (not shown), as desired. The rib 228 includes a channel 230 formed about an outer circumference of the rib 228. The channel 230 may have a diameter that is substantially equal to a diameter of the at least one aperture 18 and the rib 228 may have an outer diameter adjacent the channel 230 that is slightly greater than that of the channel 230 and the at least one aperture 18. A first end 229 of the rib 228 configured to be received within the at least one aperture 18 may be tapered. Adhesive may be applied to at least one of the interior of the channel 230 and the surface of the electrical box defining the at least one aperture 18, as desired, to secure the grommet 224 within the at least one aperture 18.

In the embodiment shown, the grommet 224 is cylindrical in shape to correspond to a circular aperture 18. However, it should be understood that the grommet 224 may be of any shape necessary to correspond to the shape of the aperture 18, including a rectangular shape, for example.

In use, the resilient aperture cover 220 may be installed into the at least one aperture 18 by first aligning the first end 229 of the rib 228 with the at least one aperture 18. Next, the user pushes the tapered first end 229 of the rib 228 into the at least one aperture 18 until the channel 230 receives the surface of the electrical box 2 defining the at least one aperture 18, thereby forming a snap-fit connection that secures a positioning of the grommet 224 within the at least one aperture 18. Once installed, an electrical wire may be inserted through the opening 225 for use within the hollow interior 8 of the electrical box 2.

In other embodiments, the resilient aperture cover 220 may be formed entirely from the resilient material, thereby eliminating the need for the grommet 224. Accordingly, the resilient material may be sized to correspond to the size of the aperture 18, or may be formed slightly larger, thereby allowing the resilient aperture cover 220 to be press-fit into the aperture 18. Alternatively, the resilient aperture cover 220 formed entirely from the resilient material may be coupled to the electrical box 2 using fasteners, adhesive, or other joining methods, as desired.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A cover for an electrical box having an exterior surface and including a rear wall, a plurality of sidewalls extending transversely from the rear wall, and at least one aperture providing access to a hollow interior of the electrical box, the cover comprising:

a main body formed from a resilient material, the main body including a rear wall and a plurality of sidewalls extending transversely from the rear wall, the plurality of sidewalls of the main body configured to elastically extend over the plurality of sidewalls of the electrical box to resiliently secure a position of the main body relative to the exterior surface of the electrical box when the rear wall of the main body is in abutment with the rear wall of the exterior surface of the electrical box, at least a portion of the main body extending over the at least one aperture formed in the electrical box when the position of the main body is resiliently secured relative to the exterior surface of the electrical box.

2. The cover of claim 1, wherein the main body includes an interior surface having a shape that substantially corresponds to a shape of at least a portion of the exterior surface of the electrical box, wherein the interior surface of the main body has a dimension reduced relative to a corresponding dimension of the exterior surface of the electrical box to resiliently secure the position of the main body relative to the exterior of the electrical box.

3. The cover of claim 2, wherein at least a portion of the interior surface of the main body defined by the rear wall of the main body includes an adhesive for adhering the rear wall of the main body to the rear wall of the electrical box.

4. The cover of claim 1, wherein the main body includes at least one scored portion, the at least one scored portion formed by a plurality of linearly arranged perforations formed in the main body.

5. The cover of claim 4, wherein the at least one scored portion of the main body is configured to overlay the at least one aperture formed in the electrical box when the position of the main body is resiliently secured relative to the exterior surface of the electrical box.

6. The cover of claim 4, wherein the at least one scored portion is configured to form a linear opening in the main body when the scored portion is penetrated.

7. The cover of claim 4, wherein the at least one scored portion includes a pair of transversely arranged scored portions configured to form a cross-hair shaped opening in the main body when the transversely arranged scored portions are penetrated.

8. The cover of claim 1, wherein the main body includes at least one opening formed therein configured to overlay the at least one aperture formed in the electrical box when the position of the main body is resiliently secured relative to the exterior surface of the electrical box.

9. The cover of claim 8, wherein portions of the main body forming the at least one opening are configured to resiliently constrict back to an original shape when the portions of the main body forming at least one opening are separated.

10. The cover of claim 8, wherein the main body includes a first portion disposed to a first side of the at least one opening and a second portion disposed to a second side of the at least one opening, wherein the first portion is resiliently drawn towards the second portion when the first portion is separated from the second portion.

11. The cover of claim 1, wherein the main body is formed from an elastomer.

12. The cover of claim 11, wherein the elastomer is butyl rubber.

13. An electrical box assembly comprising:
an electrical box having an exterior surface, the electrical box including a rear wall and a plurality of sidewalls extending transversely from a periphery of the rear wall, at least one aperture formed in the exterior surface providing access to a hollow interior of the electrical box;
a cover configured to extend over the at least one aperture, the cover formed from a resilient material configured to elastically extend over at least a portion of the exterior surface of the electrical box to secure the cover to the electrical box, wherein the cover includes an interior surface defined by a rear wall and a plurality of sidewalls extending transversely from the rear wall, wherein the interior surface of the cover has a dimension reduced relative to a corresponding dimension of the exterior surface of the electrical box to resiliently secure a position of the cover relative to the exterior of the electrical box, wherein the rear wall of the interior surface of the cover abuts the rear wall of the exterior surface of the electrical box and the plurality of sidewalls of the cover elastically constrict around the plurality of sidewalls of the electrical box.

14. The electrical box assembly of claim 13, wherein the cover includes at least one scored portion formed by a plurality of linearly arranged perforations formed in an outer surface of the cover configured to form an opening in the cover when the scored portion is penetrated.

15. An electrical box assembly comprising:
an electrical box having an exterior surface, the electrical box including a rear wall and a plurality of sidewalls extending transversely from a periphery of the rear wall, at least one aperture formed in the exterior surface providing access to a hollow interior of the electrical box;
a cover extending over the at least one aperture, the cover formed from a resilient material elastically extending over at least a portion of the exterior surface of the electrical box and resiliently securing the cover to the electrical box, the cover including a perforated portion formed in an outer surface thereof and penetrable to form an opening aligning with the at least one aperture, wherein a first portion of the cover is formed to a first side of the opening and a second portion of the cover is formed to a second side of the opening, the first portion biasing towards and selectively movable from the second portion to widen the opening to provide access to the hollow interior of the electrical box, the cover including an interior surface defined by a rear wall and a plurality of sidewalls extending transversely from the rear wall, the interior surface of the cover having a reduced dimension relative to a corresponding dimension of the exterior surface of the electrical box to resiliently secure a position of the cover relative to the exterior of the electrical box, the reduced dimension minimizing relative movement between the first portion and the second portion, wherein the rear wall of the interior surface of the cover abuts the rear wall of the exterior surface of the electrical box and the plurality of sidewalls of the cover elastically constrict around the plurality of sidewalls of the electrical box.

* * * * *